United States Patent [19]

Storz

[11] 3,896,811

[45] July 29, 1975

[54] ULTRASONIC SURGICAL INSTRUMENT

[76] Inventor: Karl Storz, Mittelstr. 8, 7200 Tuttlingen, Germany

[22] Filed: Aug. 30, 1973

[21] Appl. No.: 393,198

[30] Foreign Application Priority Data
Aug. 31, 1972 Germany............................ 2242863

[52] U.S. Cl............................... 128/328; 128/24 A
[51] Int. Cl...................... A61b 17/22; A61h 23/02
[58] Field of Search........................., 128/24 A, 328

[56] References Cited
UNITED STATES PATENTS
2,227,727  1/1941  Leggiadro...................... 128/828 X
2,714,890  8/1955  Vang............................ 128/24 A X
2,874,470  2/1959  Richards....................... 128/24 A X
3,074,408  1/1963  Chester.............................. 128/328
3,543,757  12/1970  Balaev et al. ...................... 128/328

Primary Examiner—Channing L. Pace
Attorney, Agent, or Firm—Murray Schaffer

[57] ABSTRACT

An ultrasonic surgical instrument comprising a probe and a transducer wherein at least the probe and the point of connection between the probe and the transducer are enveloped by a jacket which is spaced so as to provide an air gap substantially surrounding the probe and the transducer.

4 Claims, 2 Drawing Figures 3,896,811

ULTRASONIC SURGICAL INSTRUMENT

BACKGROUND OF INVENTION

The present invention relates to a surgical instrument and in particular to an ultrasonic probe employed to dissolve or break up stone deposits formed in the internal organs of the human body.

In recent years there has been an increasing use of surgical instruments employing high frequency or ultrasonic methods for the dissolution and break up of stones accumulated or formed in such places as the bladder, urethra, or kidney. In general, the instrument comprises an elongated probe, insertable into the organ, to which a sonic transducer is attached. The transducer is connected to a source of power such as electric current and induces in the probe a high frequency oscillation which when in contact with the stone causes the stone to disintegrate. Recently, the probe and transducer have been connected together to form a unitary instrument. The instrument may be used in conjunction with another intubation instrument such as an endoscope by which the organ may be viewed, rinsed and cleansed, if desired.

The breaking up of the stones is obtained primarily by creating in the probe a longitudinal oscillation having a large amplitude. In practice, however, during the actual operation the ultrasonic wave created is caused to fluctuate and the stability of the wave is reduced. The oscillation of the probe is hindered by the feedback created by the engagement of the oscillating probe and/or the transducer with either the associated instrument, such as the endoscope, or the body tissue against which it lies.

A further disadvantage arises from the fact that under normal operating conditions the oscillating probe heats up and thus may result in burning either the patient or doctor.

Attempts have been made to overcome these disadvantages by providing the probe, in its area of contact, for example with the endoscope, with a rubbery sleeve in order to dampen the sonic oscillation. In practice, however, such steps have only limited effects so that the named disadvantages are not completely avoided.

The present invention has an object, the provision of a surgical instrument of the type described in which the disadvantages named above are completely avoided and overcome.

It is a particular object of the present invention to provide an ultrasonic surgical probe in which, on the one hand undue influence on the oscillation of the probe during use and on the other hand, excessive external heating are both avoided.

These objects, as well as other objects and other objects and advantages will be apparent from the following specification of the present invention.

SUMMARY OF INVENTION

According to the present invention an ultrasonic surgical instrument is provided comprising a probe and a transducer wherein at least the probe and the point of connection between the probe and the transducer are enveloped by a jacket which is spaced so as to provide an air gap substantially surrounding the probe and the transducer.

With the construction of the present invention, the probe is enabled to be inserted in the human body without the oscillating member contacting or engaging the body or surrounding tissue. Likewise, when incorporated with an endoscope or the like, the oscillating portion or probe will not bear against the endoscope shaft.

The transmission of the oscillation from the probe to the adjacent portions of the body or the associated instrument is not possible because of the existence of a continual enveloping air space surrounding the probe, and while the jacket lies against neighboring portions it does not lie against the oscillating probe itself. In this manner, the full ultrasonic oscillation is efficiently developed, so that the instrument may be used with greater assurance and certainty, than heretofore.

Preferably, the jacket should bear, or be supported, on the probe with only point or line contact. As a result the jacket will bear against the probe or the transducer with primarily only a small surface so that from this basis an overheating, at this point of contact, is not possible. The number of points or lines of bearing contact should be chosen as sparingly as possible. In addition, the degree of bearing pressure of the jacket on the probe or transducer should be held as small as possible. This can be obtained through the corresponding shaping of the jacket and the bearing points. As an example, the jacket may be shaped to have only small ball like or rounded edges at the points of contact. It is also advantageous to provide the jacket as a protective cover for the transducer and may take the form of funnel or conical envelope, therefore. By suitably shaping the exterior of the jacket it may be easily used in conjunction with an endoscope or the like.

Full details of the present invention will be seen in the description of its preferred embodiments, and in the accompanying drawings.

DESCRIPTION OF THE INVENTION

Figure 1:
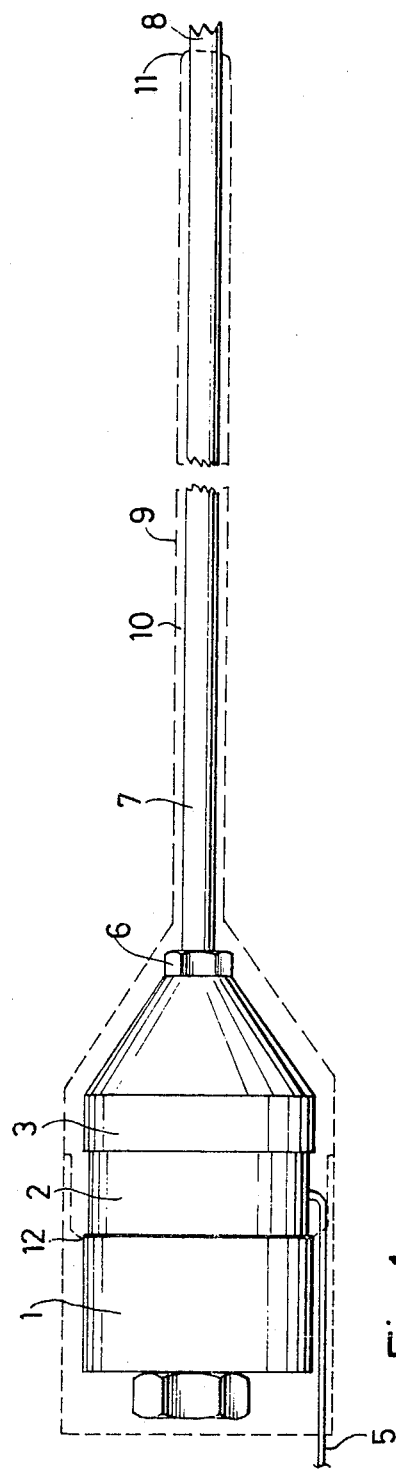
FIG. 1 is a side view of an ultrasonic surgical instrument showing schematically, the adoption of the present invention.

The ultrasonic surgical instrument seen in FIG. 1 comprises a generally conventional transducer having a steel body 1, a ceramic disk 2 and an aluminum body 3, held together by a central bolt 4. A cable 5 extends from the transducer to be connected to a power source (not shown), such as a generator or the like. The bolt 4 is provided with a nut 6 which compresses the parts of the transducer and holds them in place. The nut 6 serves as the coupling by which an elongated tubular or rod-like probe 7 is mechanically connected to the transducer in order to permit the transducer to induce oscillation in the probe. The probe 7 is provided with a scalloped end 8 by which the dissolution or break up of the stone may be effected.

The instrument, as described, is generally conventional and well known and further details of its construction or operation are not believed required. The instrument may be used alone or in conjunction with another instrument such as an endoscope or the like. The probe is inserted into the body organ to be treated (e.g.: gall bladder) directly or through the endoscope, maneuvered into contact with the stone lodged therein and then set into operation by activation of the piezoelectric transducer, so that the probe oscillates, thus breaking up the stone.

In accordance with the present invention, a jacket 9 made out of suitable material, such as stainless steel, plastic or the like, is provided to envelope at least the probe portion 7 and that portion forming the joint or coupling between the probe and the transducer. The jacket 9 is mounted on the instrument so that it is substantially and virtually completely spaced from the surface of the probe and the transducer so as to provide an air gap or space 10, continuously surrounding the exterior of the instrument. As seen in the drawing, it is preferred, although not necessary, that the jacket surround the transducer and encase the cable 5 within it, so that the cable extends outward from the upper end.

The jacket 9 provides a protective covering for the instrument and is generally tubular in shape surrounding the probe 7, flaring outward into a funnel shape to surround the transducer. It will be observed that the jacket is spaced substantially the entire length of the probe 7, as well as from about the coupling of the probe with the transducer. It is important in maintaining the space 10 and the cantilevered orientation of the jacket, that the jacket 9 bear or be supported by the transducer as well as the probe at as few points as possible. Therefore, the bearing or supporting members be made in the form of points or lines having very little contact surface.

Figure 2:
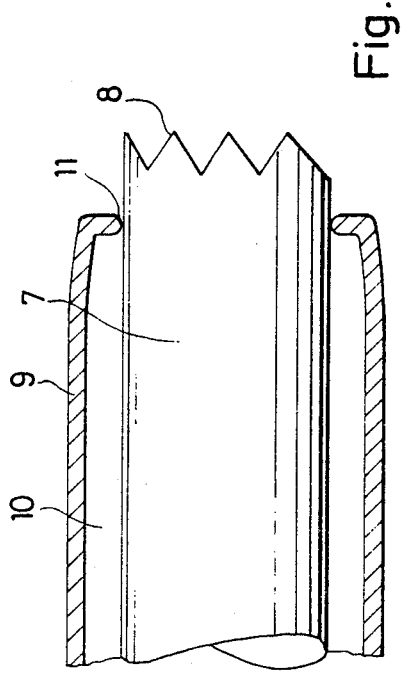
FIG. 2 is an enlarged view of a portion of FIG. 1, showing details of the present invention.

As seen in FIG. 1, suitable support can be obtained by providing only two bearings 11 and 12 respectively; the bearing 11 being situated adjacent the end 8 of the probe, while the bearing 12 being situated between the steel body 1, and the ceramic disk 2 of the transducer. In each instance the bearings 11 and 12 approximate line bearings so that the supporting faces between the instrument and the jacket is small. The bearing 11 may be formed as an inwardly projecting annular lip or flange at the probe end of the tubular extension. The bearing 12 may be spaced ribs extending longitudinally of the funnel shaped portion. As seen in FIG. 2, the edges of the bearing 11 are shaped like beads, in cross section, forming semi-circular or conical edges, insuring the line shaped contact face. The bearing 12 may be similarly shaped in cross section.

As an alternative, it is possible to provide the jacket 9 with spaced projections in the form of semi-circular or conical members, such as balls, detents, etc., which provide a point contact rather than a line contact.

In either case, it will be obvious that a jacket 9 or envelope is provided for the oscillating probe 7 which effectively shields the probe from contact with the body and which prevents the undue influence of the body on its oscillating efficiency. Furthermore, the air gap 10 and the point or line contact bearing means 11 and 12, prevents the exterior of the instrument from becoming excessively hot.

The bearing points may, if desired, be placed substantially at the nodal points of the oscillating wave or at such positions at which only a very small amplitude is expected. In this manner, even the bearing supporst will not interfere with the oscillation of the probe and the maintenance of the large amplitude necessary. Because the shape and size of the jacket is relatively small and conforms with that of the instrument, it presents no difficulty when the instrument is used with an endoscope or the like.

From the foregoing, it will be seen that the several objects, as well as numerous others, have been obtained by the present invention. Accordingly, it is intended that this disclosure be taken as illustrative only since many changes, modifications and embodiments may be made without departing from the concept and intent.

What is claimed:

1. An ultrasonic surgical instrument adapted to be mounted within an endoscope for inserting within an internal body organ, comprising an elongated probe, a transducer for inducing oscillation therein, means for connecting said transducer to one end of said probe, and a unitary jacket surrounding said probe and said transducer, said jacket being in cross section larger than said probe and transducer and having a pair of axially spaced radially inwardly directed bearing means for supporting said jacket on said transducer and on the probe at the end opposite said transducer spaced uniformly from said probe and said transducer to provide a radial air gap enveloping said probe and transducer.

2. The instrument according to claim 1, wherein said bearing means provide point contact with said probe.

3. The instrument according to claim 1, wherein said bearing means provide line contact with said probe.

4. The instrument according to claim 1, wherein said jacket extends to fully envelope said transducer.

* * * * *